April 12, 1927.

S. R. DODDS 1,624,589

DIFFERENTIAL DRIVING MECHANISM

Filed Oct. 7, 1925     2 Sheets-Sheet 1

INVENTOR.
Samuel R. Dodds
BY C. M. Clarke
ATTORNEY

April 12, 1927.
S. R. DODDS
1,624,589
DIFFERENTIAL DRIVING MECHANISM
Filed Oct. 7, 1925  2 Sheets-Sheet 2
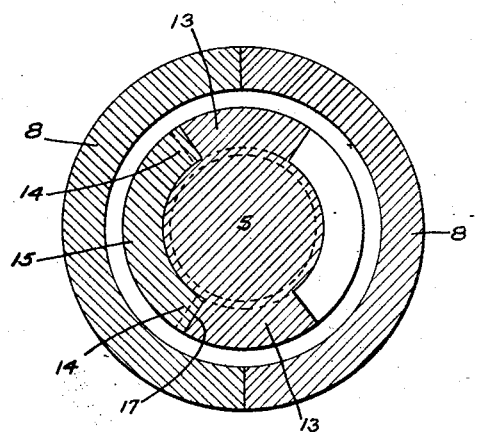
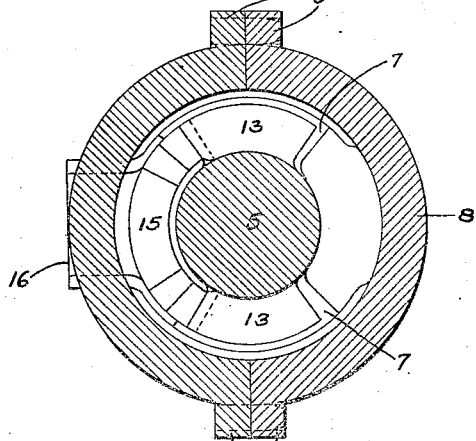
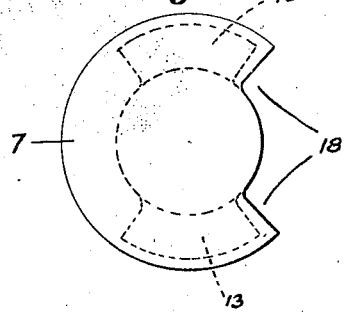
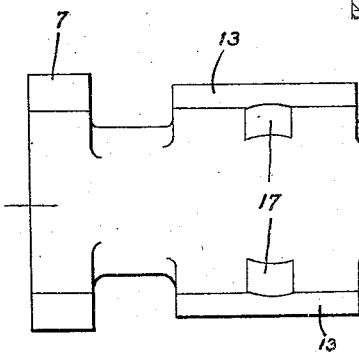
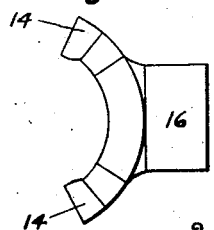
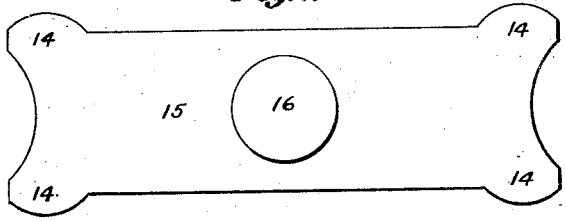
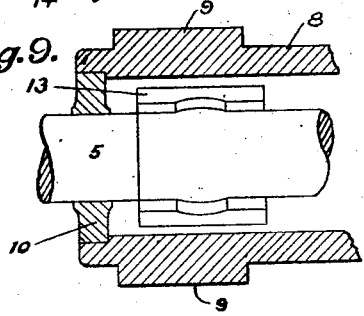
INVENTOR.
Samuel R. Dodds
BY C. M. Clarke
ATTORNEY Patented Apr. 12, 1927.

1,624,589

UNITED STATES PATENT OFFICE.

SAMUEL R. DODDS, OF PITTSBURGH, PENNSYLVANIA.

DIFFERENTIAL-DRIVING MECHANISM.

Application filed October 7, 1925. Serial No. 61,056.

My invention refers to an improvement in driving mechanism adapted to impart equalized power to each member of a pair of power transmitting shafts, through the agency of an equalizing bar or link, constructed and adapted to operate in the manner hereinafter described.

Wherever power is transmitted from a driving motor or prime mover of any kind at each side of a driving center, as in axles, shafting, etc., and through gearing having inflexible driving connection with other gearing, it is desirable to equalize the pressure and power transmitting torque of the plural gears for equal wear and power transmission. In order to accomplish such results I divide the driving gear shaft and mount the individual members thereof in such manner as to ensure proper alinement, with a limited relative independent rotation of either individual shaft, and connect each member with the source of power by means of equalizing bar. In the construction shown, illustrating one preferred embodiment of the invention, the equalizing bar is mounted within a driving housing and connected therewith by a middle pin or lug, and by each end portion with parts of the confronting end portions of the shafts, by flexible contacting bearing portions.

In the drawings:—

Fig. 3 is a cross section on the line III—III of Fig. 2.

Fig. 4 is a cross section on the line IV—IV of Fig. 2.

Fig. 5 is a view of the coupling end of one of the driving shafts.

Fig. 6 is an inner end view thereof.

Fig. 7 is a detail face view of the equalizing bar.

Fig. 8 is an end view thereof.

Fig. 9 is a sectional detail view showing a modified construction of the housing shaft bearing.

Figure 1:
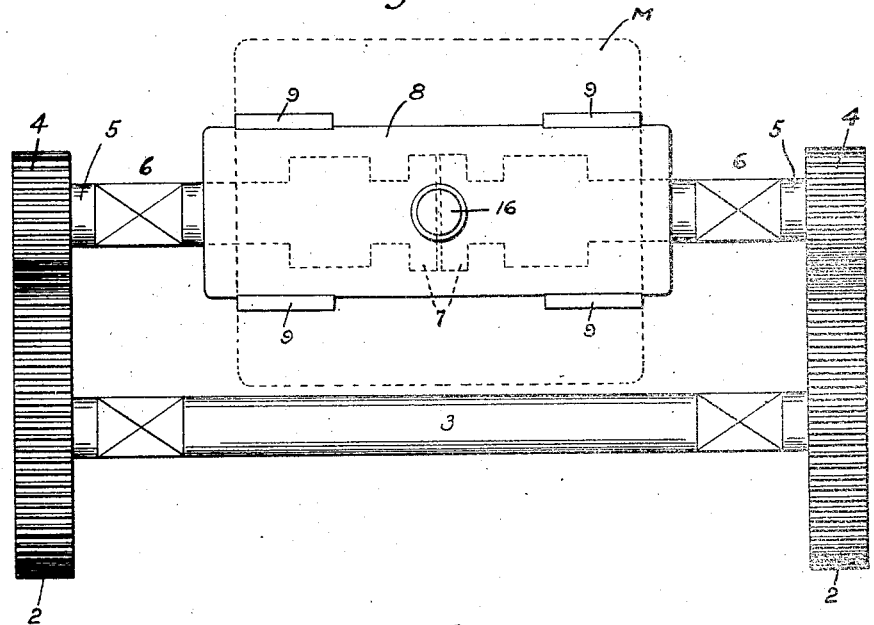
Fig. 1 is a diagrammatic plan view showing the invention as applied to the double gears of a driven shaft.

In the drawings, Figure 1 shows the application of the invention for the purpose of driving the gears 2—2 of shaft 3 by pinions 4—4 of the individual compensating coupled driving shafts 5—5.

Figure 2:
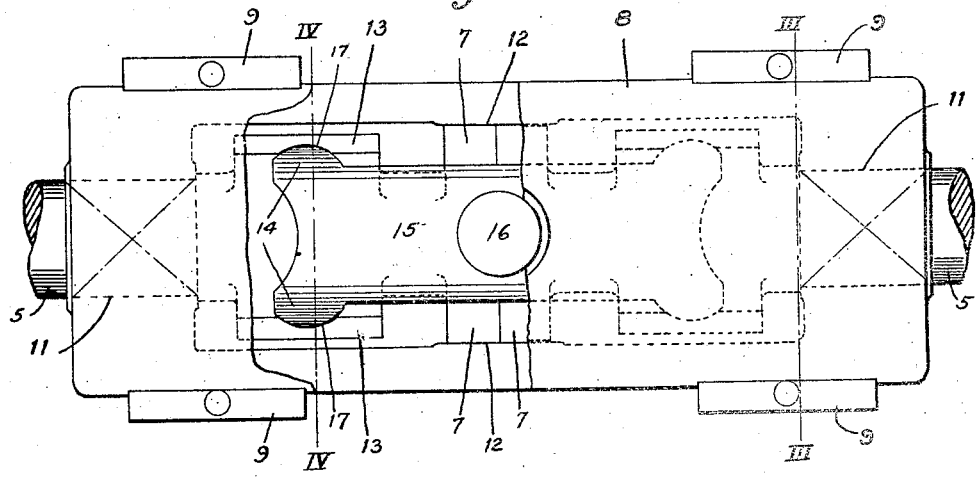
Fig. 2 is an enlarged view of the equalizing mechanism, partly broken away.

Shafts 5 are mounted in suitable bearings as indicated at 6—6 and their inner ends extend into abutting engagement by terminal flanges 7—7 at the middle portion of an enclosing housing or sleeve 8. As shown such housing is provided with oppositely extending lugs for driving connection with the spider of the armature of an electric motor M, or other prime mover, of any suitable construction. The housing may be two part, as shown, for assembly of the parts, in which case the lugs 9 may extend from opposite side portions integrally, or they may be divided at the meeting middle portion of the housing, with centering dowel pins, as in Figs. 2 and 3.

Alternatively, the housing may be made solid, with one of the end journal bearings for the shaft removable, as indicated at 10, Fig. 9. With either construction thus connected with the armature of a motor, or otherwise with the driving element of any power imparting unit, the housing will be rotated for imparting movement to the shafts 5.

Said shafts are journalled in the ends of the housing at 11 and are each provided with flanged heads 7, in abutting engagement and having finished bearing engagement by their rims against the inner annular bearing portion 12 of the housing, for maintaining alinement.

Between such flanged ends and the bearing 11 each shaft 5 is reinforced by radially extending wings 13 forming rotating abutments for engagement by the end portions 14 of the equalizing bar 15. Said bar is in driving connection with the housing 8 by a middle stud or pin 16 extending through a hole in the wall of the housing, as shown.

Such stud may be integral, or separately inserted by a driving or threaded fit, as preferred.

The equalizing bar 15 has a pivotal or rocking mounting with relation to the housing 8 by stud 16. The end bearing portions 14 of the bar are rounded as at 17 and interfit with corresponding concave sockets 17 of the shaft ears 13. The co-acting surfaces of these parts are ground or otherwise finished to provide good bearing contact so as to avoid friction, and the interior of the housing may if desired, be filled with any suitable lubricant. As thus constructed the meeting ends of shafts 5 are in a sense coupled together by the equalizing bar 15 so that as the housing 8 rotates with the bar, its outer ends 14 will bear against the ears 13, equalizing the pressure at each side and allowing for sufficient deflection to adjust the pinions 4 with relation to gears 2 for equal transmission of power with a minimum of equally divided friction.

As shown, the ears 13, extending in opposite directions, provide intervening clearance for interfitting location of the ends of the equalizing bar, while the terminal flanges 7 are interrupted as at 18 to provide clearance for the same purpose.

In such arrangement it will be obvious that the shafts may be driven in either direction, as by a reversible motor.

The construction and operation of the invention will be readily understood and appreciated from the foregoing description.

The rotation of the housing and the maintenance of the proper relation of the parts results in equal transmission of power through both shafts, while their journal bearings 11 in the ends of the housing, and by their flanges 7 at its middle, ensure continuous alinement at all times.

If desired, the flanges 7 may be cut out at both opposite sides as at 18 instead of one side only, to equalize the weight of the flange, and to balance the construction in operation.

It will be understood of course that the meeting surfaces of the parts may be of hardened metal or that inserted bearing members may be used to reduce wear.

Also that the construction may be variously changed or modified in different respects by the skilled mechanic, but all such changes are to be considered as within the scope of the following claims.

What I claim is:—

1. The combination with a plurality of end confronting driving shafts each having a lateral abutment, of an outer surrounding armature, a power imparting housing within the armature, and an equalizing bar engaging said abutments within and in rotative connection with the power imparting housing.

2. The combination with a plurality of end-to-end driving shafts each having a laterally projecting bearing abutment, of an outer surrounding armature, an equalizing bar having opposite bearing terminals engaging said abutments and a central stud, and a surrounding rotatable housing within the armature having means for connection therewith and in driving engagement with the stud.

3. The combination with a plurality of oppositely extending end-to-end driving shafts having laterally extending abutments, an outer surrounding armature, and an enclosing housing for the shafts having means for connection with the outer surrounding armature, of a partly cylindrical equalizing bar provided with oppositely disposed bearing portions engaging an abutment of each shaft and having an intervening connection with the housing.

4. The combination with a plurality of oppositely extending driving shafts in end-to-end abutting engagement and having laterally extending abutments forming annular portions and an enclosing housing therefor, providing centralizing bearings for the annular portions of the abutting ends of the shafts and having means for connection with an outer surrounding rotating element, of an equalizing bar within the housing rotatably and pivotally connected therewith and having partly cylindrical end portions engaging the shaft abutments.

5. Equalizing driving mechanism for a pair of oppositely extending end contacting shafts each having a laterally extending abutment consisting of an embracing housing having external lugs for connection with the armature of a driving motor and provided with a middle stud bearing, and a partly cylindrical equalizing bar within the housing having a stud engaging said bearing and provided with oppositely extending rounded terminals each engaging an abutment of said shafts.

6. The combination with a pair of abutting shafts in axial alinement having annular bearing flanges and radially disposed abutments, of a surrounding housing therefor provided with a middle interior annular bearing section for said bearing flanges and a middle radially extending stud bearing, a partly cylindrical equalizing bar having terminals engaging the shaft abutments and a middle stud pivotally engaging said stud bearing, and lugs on the exterior of the housing for driving connection with an outer surrounding motor armature.

In testimony whereof I hereunto affix my signature.

SAMUEL R. DODDS.